(12) United States Patent
Fountain

(10) Patent No.: US 8,457,247 B2
(45) Date of Patent: Jun. 4, 2013

(54) IN-BAND GENERATION OF LOW-FREQUENCY PERIODIC SIGNALING

(75) Inventor: Mark Fountain, Oxford (GB)

(73) Assignee: PLX Technology, Inc., Sunnyvale, CA (US)

( * ) Notice: Subject to any disclaimer, the term of this patent is extended or adjusted under 35 U.S.C. 154(b) by 338 days.

(21) Appl. No.: 12/949,706

(22) Filed: Nov. 18, 2010

(65) Prior Publication Data

US 2012/0128091 A1     May 24, 2012

(51) Int. Cl.
*H04L 27/00* (2006.01)

(52) U.S. Cl.
USPC ........... 375/295; 375/271; 375/297; 375/302; 375/306; 375/316

(58) Field of Classification Search
USPC ................. 375/219, 271, 294, 295, 302, 306, 375/316, 322
See application file for complete search history.

(56) References Cited

U.S. PATENT DOCUMENTS

| | | | |
|---|---|---|---|
| 6,002,717 A * | 12/1999 | Gaudet | 375/232 |
| 6,510,185 B2 * | 1/2003 | Lee et al. | 375/327 |
| 7,821,493 B2 * | 10/2010 | Tierling et al. | 345/156 |
| 8,027,657 B2 * | 9/2011 | Staszewski et al. | 455/323 |
| 8,166,221 B2 * | 4/2012 | Lee et al. | 710/74 |
| 8,255,582 B2 * | 8/2012 | Wong et al. | 710/14 |
| 2009/0176449 A1 * | 7/2009 | Tashiro | 455/39 |
| 2010/0013579 A1 * | 1/2010 | Horan et al. | 333/28 R |
| 2011/0231685 A1 * | 9/2011 | Huang et al. | 713/321 |
| 2011/0296215 A1 * | 12/2011 | Mobin et al. | 713/323 |
| 2012/0020404 A1 * | 1/2012 | Hsieh et al. | 375/231 |

* cited by examiner

*Primary Examiner* — Hirdepal Singh
(74) *Attorney, Agent, or Firm* — Beyer Law Group LLP

(57) ABSTRACT

In a first embodiment of the present invention, a method for communicating main and auxiliary data over a transmission medium is provided, the method comprising: generating a low-frequency output pattern using a high-frequency oscillator, wherein the low-frequency output pattern contains the auxiliary data encoded in a first scheme, wherein the first scheme resembles an output pattern that would be generated by a low-frequency oscillator; sending the low-frequency output pattern through a transmitter to be transmitted over the transmission medium; generating a high-frequency signal using a high-frequency oscillator, wherein the high-frequency signal contains the main data encoded in a second scheme different than the first scheme; and sending the high-frequency signal through the transmitter to be transmitted over the transmission medium.

20 Claims, 9 Drawing Sheets

| | tBurst | | | Minimum Number of LFPS Cycles² | tRepeat | | |
|---|---|---|---|---|---|---|---|
| | Min | Typ | Max | | Min | Typ | Max |
| Polling LFPS | 0.6 µs | 1.0 µs | 1.4 µs | | 6 µs | 10 µs | 14 µs |
| Ping LFPS | 40 ns | | 200 ns | 2 | 160 ms | 200 ms | 240 ms |
| tReset³ | 80 ms | 100 ms | 120 ms | | | | |
| U1 Exit⁴,⁵ | 300 ns | | 900 ns/2 ms⁶ | | | | |
| U2 / Loopback Exit⁴,⁵ | 80 µs⁷ | | 2 ms | | | | |
| U3 Wakeup⁴,⁵ | 80 µs⁷ | | 10 ms | | | | |

Notes:
1. If the transmission of an LFPS signal does not meet the specification, the receiver behavior is undefined.
2. Only Ping LFPS has a requirement for minimum number of LFPS cycles.
3. The declaration of Ping LFPS depends on only the Ping LFPS burst.
4. Warm Reset, U1/U2/Loopback Exit, and U3 Wakeup are all simple burst LFPS signals. tRepeat is not applicable.
5. The minimum duration of an LFPS burst must be transmitted as specified. The LFPS handshake process and timing are defined in Section 6.9.2.
6. If both ports are in U1, tBurst Max is 900 ns; if one port is in U1 and the port is in U2, tBurst Max is 2 ms.
7. A Port in U2 or U3 is not required to keep its transmitter DC common mode voltage. When a port begins U2 exit or U3 wakeup, it may start sending LFPS signal while establishing its transmitter DC common mode voltage. To make sure its link partner receives a proper LFPS signal, a minimum of 80 µs tBurst must be transmitted. The same consideration also applies to a port receiving LFPS U2 exit or U3 wakeup signal.

FIG. 4

IN-BAND GENERATION OF LOW-FREQUENCY PERIODIC SIGNALING

BACKGROUND OF THE INVENTION

1. Field of the Invention

The present invention relates generally to electronic communication. More specifically, the present invention relates to the in-band generation of low-frequency periodic signaling.

2. Description of the Related Art

Universal Serial Bus (USB) protocol is a standard communications protocol for sending signals between devices and host controllers. USB has become the standard mechanism to communicate between computer devices, and is commonly used to link peripherals, such as keyboards, mice, external disk drives, etc. with personal computers. It is also quite commonly used to link various self-sufficient devices, such as cellular phones, portable media devices, etc. with personal computers.

USB 3.0, also known as SuperSpeed USB, is the latest iteration of the USB standard. It incorporates a "SuperSpeed" bus to achieve communication speeds of up to 5.0 Gb/s. Part of the USB 3.0 protocol describes the use of Low-Frequency Periodic Signaling (LFPS). Specifically, a high-frequency oscillator is used to generate high-frequency communications for the main data communication (e.g., content) that is being transferred between devices. However, a separate low-frequency oscillator is used for low-frequency sideband communication between two ports of a link in a low power state for various auxiliary functions, such as signal initialization and power management. It is also used when a link is under training, or when a downstream port issues a Warm Reset command to reset a link.

LFPS is commonly used when the link is in a low power mode, and thus a low power low-frequency oscillator is used for such communications. The low-frequency oscillator's clock is neither frequency nor phase synchronous to the high-frequency oscillator's clock, which is typically a PLL generated clock used for high-speed data generation. Thus, while the low-frequency oscillator uses less power than the high-frequency oscillator, it is in a different clock domain and requires separate management, which adds complexity and cost to any circuits designed for the transmission and receipt of the LFPS signals.

What is needed is a solution that does not suffer from these issues.

SUMMARY OF THE INVENTION

In a first embodiment of the present invention, a method for communicating main and auxiliary data over a transmission medium is provided, the method comprising: generating a low-frequency output pattern using a high-frequency oscillator, wherein the low-frequency output pattern contains the auxiliary data encoded in a first scheme, wherein the first scheme resembles an output pattern that would be generated by a low-frequency oscillator; sending the low-frequency output pattern through a transmitter to be transmitted over the transmission medium; generating a high-frequency signal using a high-frequency oscillator, wherein the high-frequency signal contains the main data encoded in a second scheme different than the first scheme; and sending the high-frequency signal through the transmitter to be transmitted over the transmission medium.

In a second embodiment of the present invention, a Low-Frequency Periodic Signaling (LFPS) generator is provided comprising: a high-frequency generator configured to generate both high-frequency signals containing main data and LFPS signals containing auxiliary data, wherein the LFPS signals are encoded in a different encoding scheme than the high-frequency signals; a serializer; a multiplexer connected between the high-frequency generator and the serializer and configured to, when LFPS is enabled, take the LFPS signals generated by the high-frequency generator and pass them through the serializer and configured to, when LFPS is not enabled, take the high-frequency signals generated by the high-frequency generator and pass them through the serializer; and a transmitter coupled to the serializer.

In a third embodiment of the present invention, an apparatus for communicating main and auxiliary data over a cable is provided, the apparatus comprising: means for generating a low-frequency output pattern using a high-frequency oscillator, wherein the low-frequency output pattern contains the auxiliary data encoded in a first scheme, wherein the first scheme resembles an output pattern that would be generated by a low-frequency oscillator; means for sending the low-frequency output pattern through a transmitter to be transmitted over the transmission medium; means for generating a high-frequency signal using a high-frequency oscillator, wherein the high-frequency signal contains the main data encoded in a second scheme different than the first scheme; and means for sending the high-frequency signal through the transmitter to be transmitted over the transmission medium.

In a fourth embodiment of the present invention, a non-transitory program storage device readable by a machine, tangibly embodying a program of instructions executable by the machine to perform a method for communicating main and auxiliary data over a cable, the method comprising: generating a low-frequency output pattern using a high-frequency oscillator, wherein the low-frequency output pattern contains the auxiliary data encoded in a first scheme, wherein the first scheme resembles an output pattern that would be generated by a low-frequency oscillator; sending the low-frequency output pattern through a transmitter to be transmitted over the transmission medium; generating a high-frequency signal using a high-frequency oscillator, wherein the high-frequency signal contains the main data encoded in a second scheme different than the first scheme; and sending the high-frequency signal through the transmitter to be transmitted over the transmission medium.

BRIEF DESCRIPTION OF THE DRAWINGS

FIG. 4 is a table illustrating different types of messages that may be encoded in an LFPS waveform.

DETAILED DESCRIPTION OF SPECIFIC EMBODIMENTS

Figure 1:
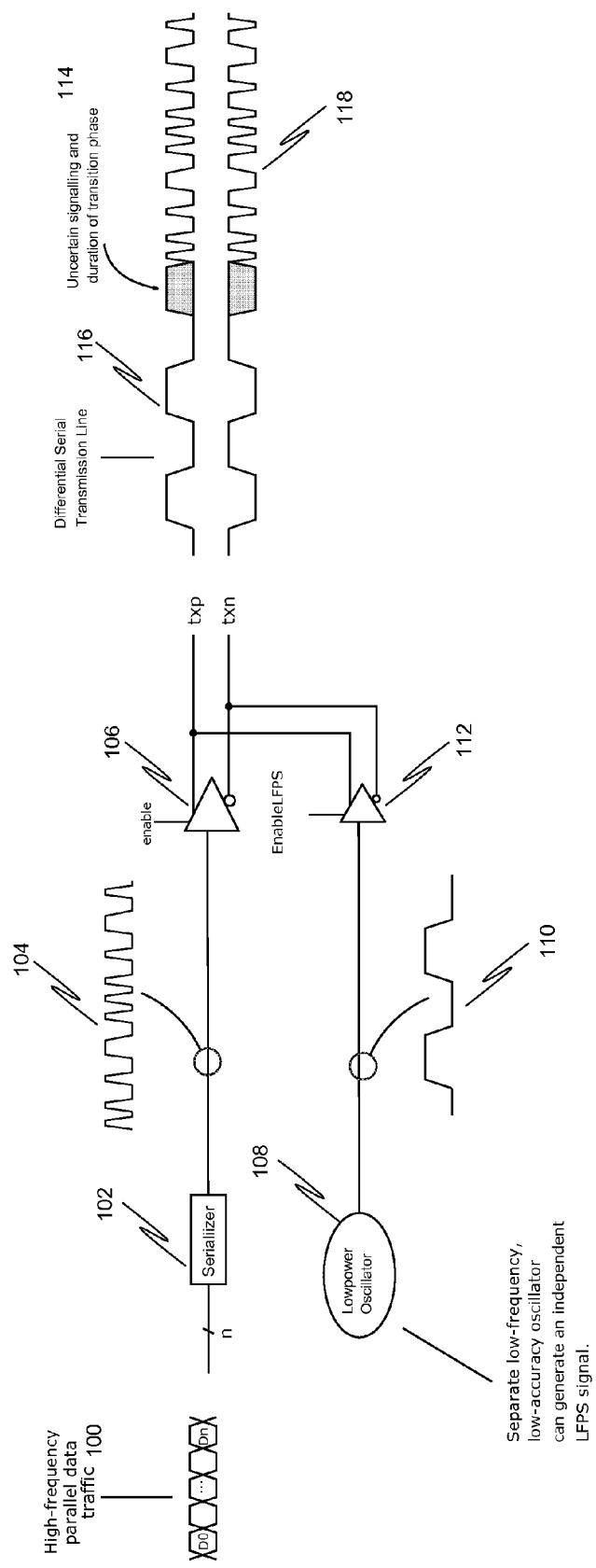
FIG. 1 is a circuit diagram illustrating a typical prior art circuit for switching in a LFPS stream into a high-frequency signal stream.

Reference will now be made in detail to specific embodiments of the invention, including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

In accordance with the present invention, the components, process steps, and/or data structures may be implemented using various types of operating systems, programming languages, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. The present invention may also be tangibly embodied as a set of computer instructions stored on a computer readable medium, such as a memory device.

The present invention provides for Low-Frequency Periodic Signaling (LFPS) using the same high-frequency oscillator as is used for normal data communication. This eliminates the need for a separate low-frequency oscillator and reduces the complexity and cost of electronic circuits used to implement the technology. The low-frequency pattern is generated by transmitting high-frequency symbols to create what looks like a low-frequency signal on the bus. The symbols utilized are not specifically part of a normal encoding scheme symbol set, such as 8b10b. The symbols are generated in a way that puts repeating is followed by repeating 0s onto the data bus, using, for example, differential signaling. Each set of parallel symbols represents a low-frequency period following a serialization state. The sequence is repeated for the duration of the LFPS signaling phase.

It should be noted that while the present invention negates the need for a separate low-frequency clock generator, embodiments are possible where a separate low-frequency clock generator is still utilized, and thus the present invention should not be limited to embodiments involving circuits having only high-frequency clock generators. For example, an embodiment is foreseen wherein a separate low-frequency clock generator is used for some LFPS signals, while the high-frequency clock generator is used for other LFPS signals.

In an embodiment of the present invention, the in-band LFPS generation is achieved by transmitting a low-frequency pattern via the high-frequency data path. Where normally correct high-frequency symbols are transmitted (such as 8b10b encoded patterns), repeated patterns of ones and zeroes are substituted. It should be noted that there is no requirement for high-frequency clock recovery or disparity checking during this low-frequency pattern phase, although embodiments are possible where such recovery and/or checking are performed anyway.

Because this pattern is generated by substituting symbols in the high-frequency data path, it is possible to switch over to high-frequency traffic within the high-frequency clock period, thus easily meeting cross-talk design requirements. Such requirements insist on a very short idle period on the bus between the end of LFPS signaling and high-frequency symbols. This is to help prevent a high-frequency signal being transmitted from being confused with a high-frequency signal being received.

It should be noted that the method requires the high-frequency clock generator (e.g., core PLL) to be running in order to generate the LFPS. This will require more power than using a separate low-power block. That is because the low-power block would sleep again if the LFPS is unsuccessful without needing to enable the high-frequency clock generator. However, the inventor of the present invention recognized that one intended outcome of using the LFPS is to transition to a fully functioning (higher power) state. Thus, the increase in power usage by using the high-frequency clock generator to generate LFPS signals is minimal, since in most cases the high-frequency clock generator would be woken up anyway. Nevertheless, any loss in power savings is counteracted by the decrease in complexity and cost of the circuit.

In one embodiment of the present invention, a multiplexer is used in the high-frequency data path to select data for transmission onto the data bus via the transmit drivers. The data may travel through a register stage to improve timing. The multiplexer may select one of two parallel data streams—one for high-speed traffic and the other for low-frequency traffic. The inputs to the multiplexer and the selected output data stream are all in the same high-speed clock domain. This allows the changeover between data streams to be synchronous and, if necessary, on the same clock cycle.

The data is then serialized and transmitted on the serial bus as a single bit data stream. It should be noted that while this invention is described for use of serial bus management, embodiments are possible where the invention could equally be applied to multiple transmission lines or a parallel system.

The data bus widths at the input to the multiplexer can depend on the required throughput and clock rates. The symbol pattern required to generate a low-frequency pattern will depend upon the data bus width and the desired low-frequency. The low-frequency pattern may also be generated using a different clock from the high-frequency clock as long as it is phase and frequency synchronous to the higher frequency clock.

It should also be noted that while the symbols needed to generate the low-frequency patterns may be all 1s or all 0s, it is possible that a cross-over symbol may be composed of some 1s and some 0s in order to accommodate a finer adjustment in frequency than that determined by the bit length of the symbols.

FIG. 1 is a circuit diagram illustrating a typical prior art circuit for switching in a LFPS stream into a high-frequency signal stream. Here, high-frequency parallel data traffic 100 is generated by a high power oscillator (not pictured) and passed to a serializer 102, producing a serial stream of high-frequency traffic 104. When enabled, differential line driver 106 then allows for transmission of the high-frequency traffic 104 over the transmission line.

Figure 2:
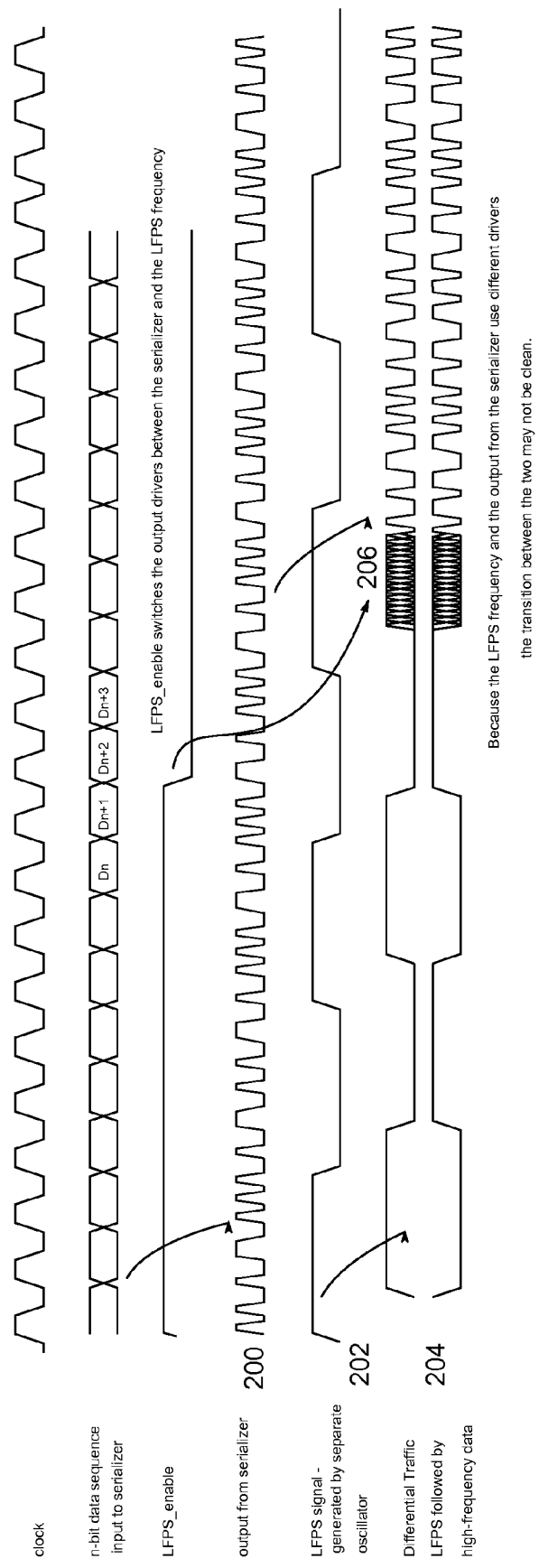
FIG. 2 is a timing diagram of a typical prior art circuit for switching in a LFPS stream into a high-frequency signal stream.

When it is necessary to send a LFPS, the low power, low-frequency oscillator 108 generates the LFPS signal 110, and, when enabled, differential line driver 112 transmits the LFPS signal over the transmission line. As can be seen, however, using this prior art embodiment, there is a certain period of time 114 between when the LFPS is transmitted 116 and the high-frequency traffic is transmitted 118 where signaling and duration of the transition phase is uncertain. This is due to factors such as the low-frequency and high-frequency oscillators being asynchronous and variations in the enable/disable delays of the differential line drivers. This is further illustrated in FIG. 2, which is a timing diagram of a typical prior art circuit for switching between an LFPS signal and a high-frequency signal. As can be seen, the high-frequency signal, after being output from the serializer is depicted at 200. The LFPS signal generated by a separate oscillator is depicted as 202. These signals are then switched, resulting in the differential traffic 204. However, because the LFPS and the output from the serializer use different drivers, the transition between the two may not be clean, resulting in an uncertainty period 206.

As described earlier, the present invention solves these problems by providing a solution wherein the high-frequency generator can generate both the high-frequency traffic and the LFPS.

Figure 3:
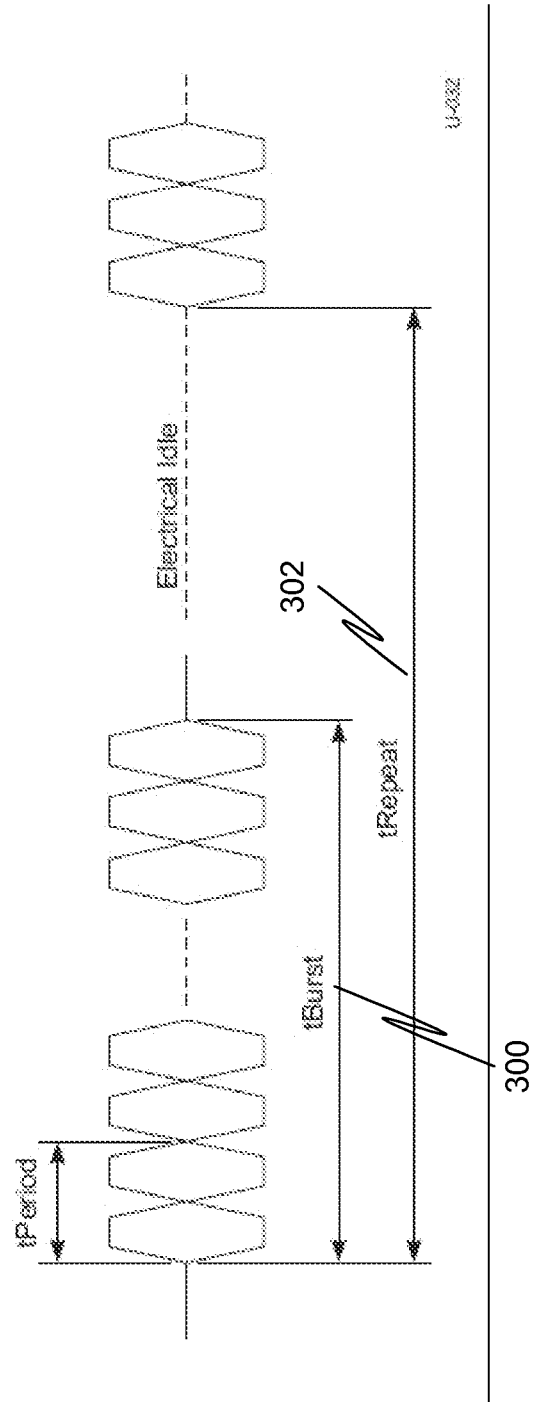
FIG. 3 is a diagram illustrating an example differential LFPS waveform in accordance with the USB 3.0 specification.

Specifically, FIG. 3 is a diagram illustrating an example differential LFPS waveform in accordance with the USB 3.0 specification. An LFPS burst is the transmission of a continuous LFPS signal over a period of time defined by tBurst 300. An LFPS sequence is defined by the transmission of a single LFPS burst of duration tBurst 300 over a period of time defined by tRepeat 302. The link is in electrical idle between the two contiguous LFPS bursts.

An LFPS message is encoded based on the variation of tBurst 300. tRepeat 302 is defined as a time interval when the next LFPS message is transmitted. There are a variety of different LFPS signals that can be sent in this manner, which are shown in FIG. 4. As can be seen from FIG. 3 and FIG. 4, it is expected that this LFPS signal will be generated by pulsing a low-frequency generator on and off. As described above, however, the present invention involves generating an LFPS signal without having to use a low-frequency generator.

Figure 5:
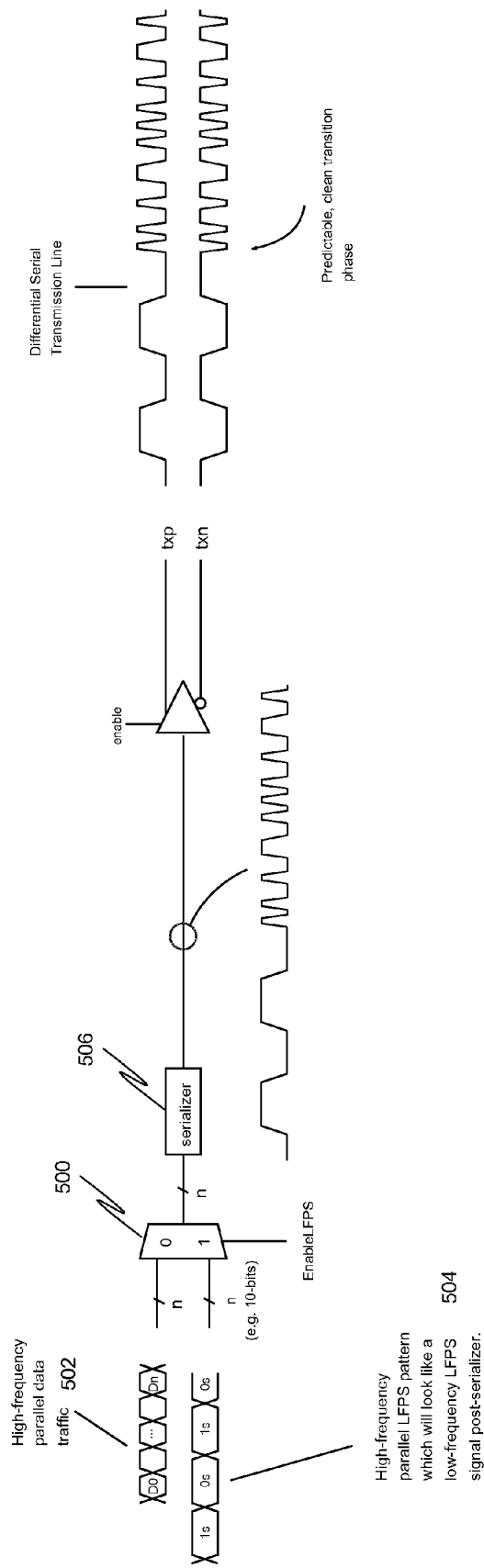
FIG. 5 is a circuit diagram illustrating an example implementation of the present invention.

FIG. 5 is a circuit diagram illustrating an example implementation of the present invention. Here, a multiplexer 500 is provided which allows the system to choose from LFPS or high-frequency signals. The high-frequency parallel data traffic 502 is generated identically to that of the prior art systems. The LFPS 504, however, is also generated by the high-frequency generator. It is designed, however, to look like a low-frequency LFPS signal after passing through the serializer 506.

Figure 6:
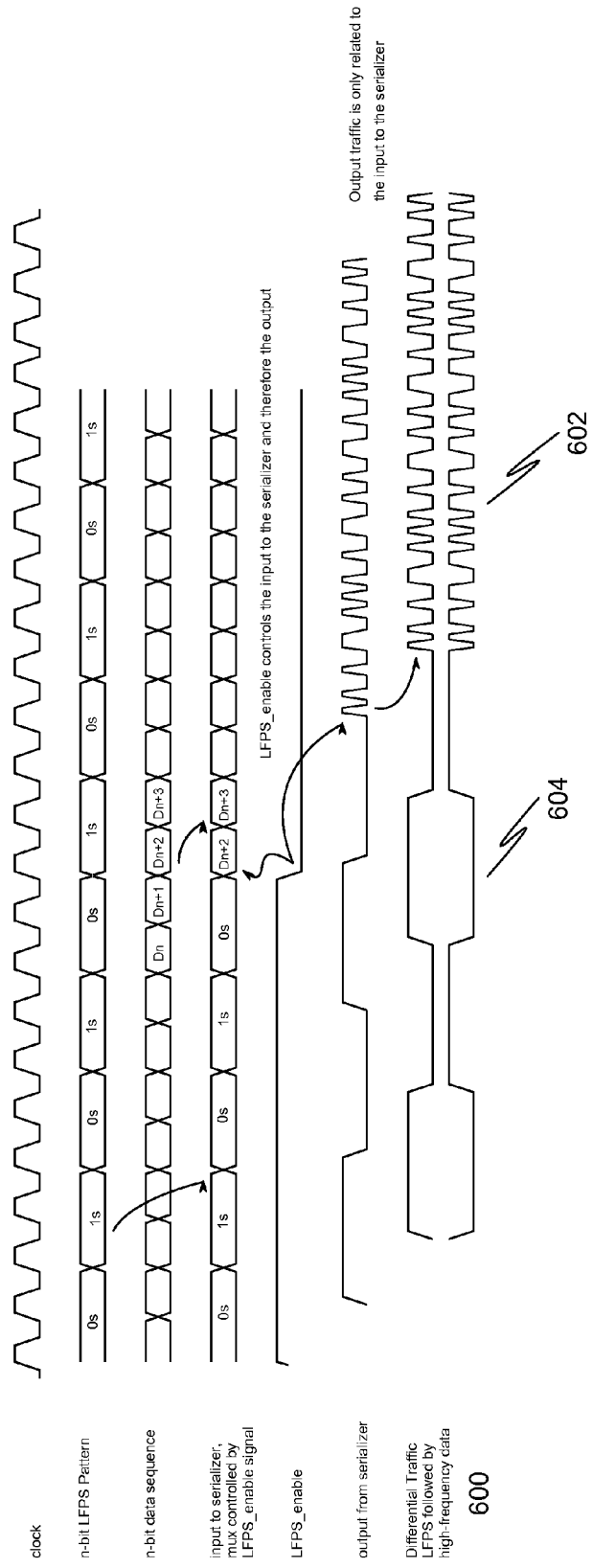
FIG. 6 is a timing diagram illustrating the timing of the example embodiment of the present invention.

FIG. 6 is a timing diagram illustrating the timing of the example embodiment of the present invention. As can be seen, the output traffic is only related to the input to the serializer and it is easy to tell from the differential traffic 600 which portion relates to high-frequency data 602 and which portion relates to LFPS 604 (i.e., there is no uncertainty period).

Figure 7:
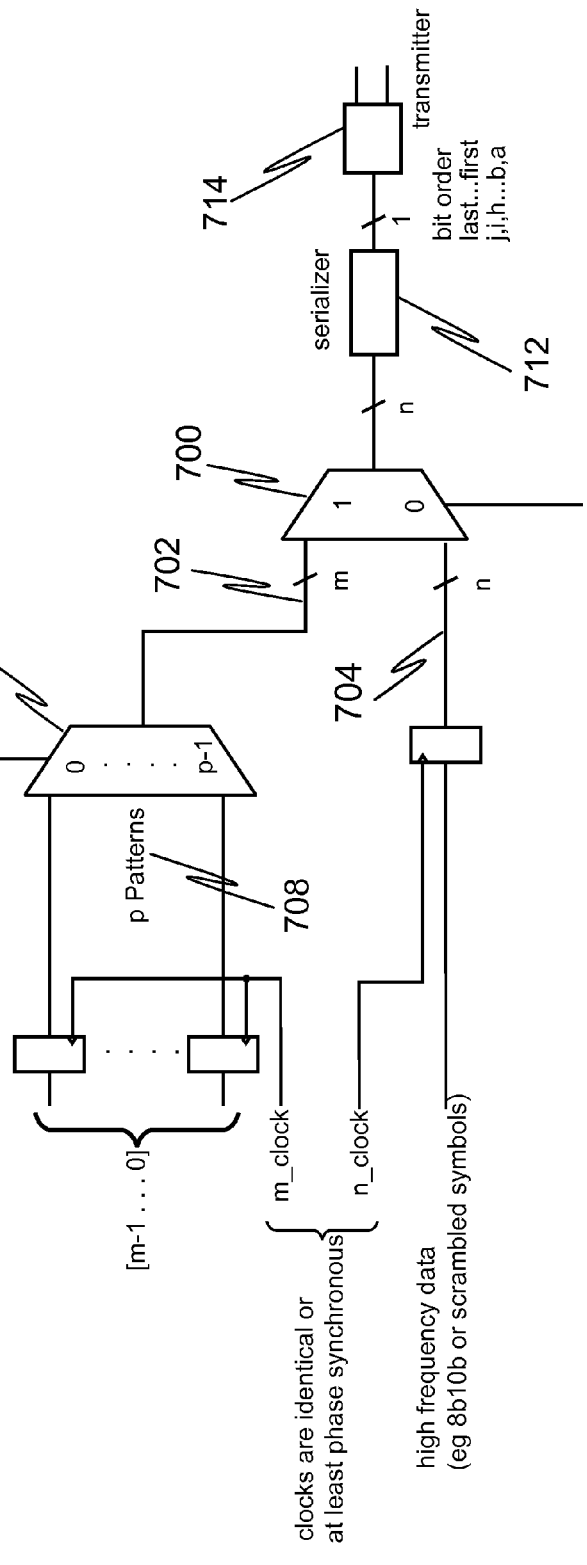
FIG. 7 is a block diagram illustrating a multiplexer implementation of the present invention.

FIG. 7 is a block diagram illustrating a multiplexer implementation of the present invention. Here, multiplexer 700 switches between the LFPS signal 702 and the high-frequency signal 704. The LFPS signal 702 is generated by using multiplexer 706 to multiplex p different patterns 708, using p counter 710. Multiplexer 700 is able to switch between transmitting the LFPS signal 702 or the high-frequency signal 704 to the serializer 712, the output of which is sent to the transmitter 714.

It should be noted that the transmitter 714 can be configured to transmit over a wide variety of transmission media, including, for example, a physical cable, an optical fiber, or a wireless transmission band.

Figure 8:
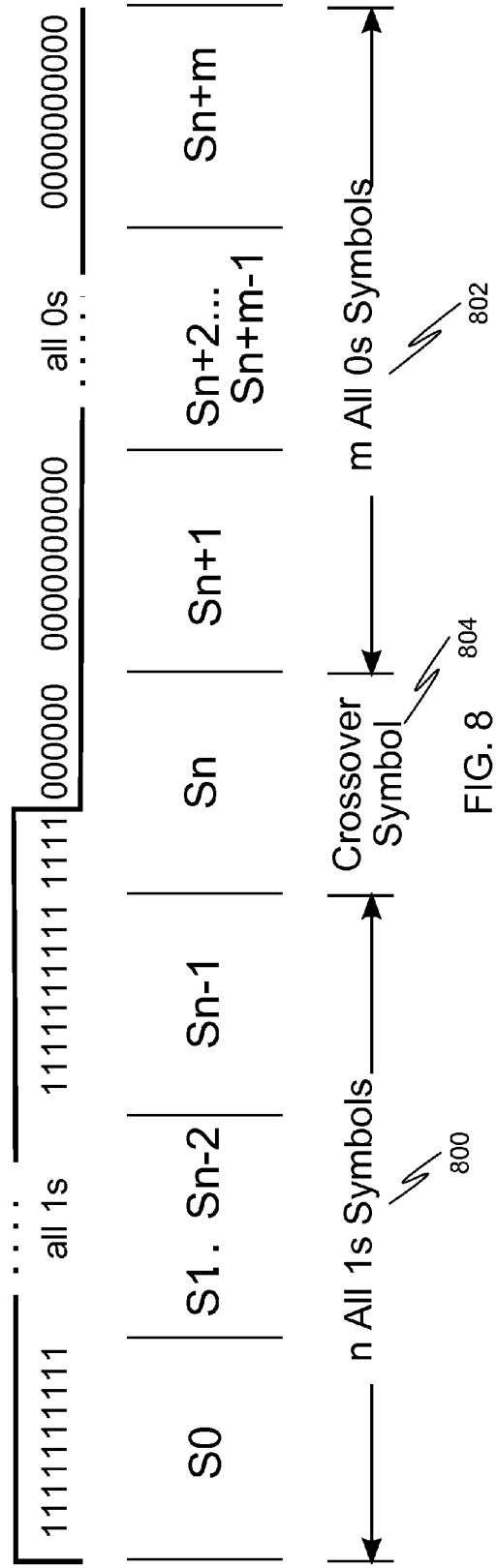
FIG. 8 is a diagram showing how a stored table of low-frequency symbols of 10 bits each can be used to generate a low-frequency pattern consisting of a repetitive waveform of a given frequency and mark/space ratio.

FIG. 8 is a diagram showing how a stored table of low-frequency symbols of 10 bits each can be used to generate a low-frequency pattern consisting of a repetitive waveform of a given frequency and mark/space ratio. In this example there are n symbols 800 with all 1s, m symbols 802 with all 0s and a single crossover symbol 804 with some number of is followed by 0s. If symbols containing only all 1s or all 0s were used, only a set of coarse discrete frequencies and mark/space ratios for the pattern can be chosen, according to integer values for n, the number of successive all 1s symbols, and m, the number of successive all 0s symbols. In some cases, a finer adjustment may be necessary and therefore a crossover symbol consisting of 1s followed by 0s enables the transition point from 1 to 0 of the resultant LFPS signal to be set with more precision, allowing a greater range of frequencies and mark/space ratios to be chosen.

Figure 9:
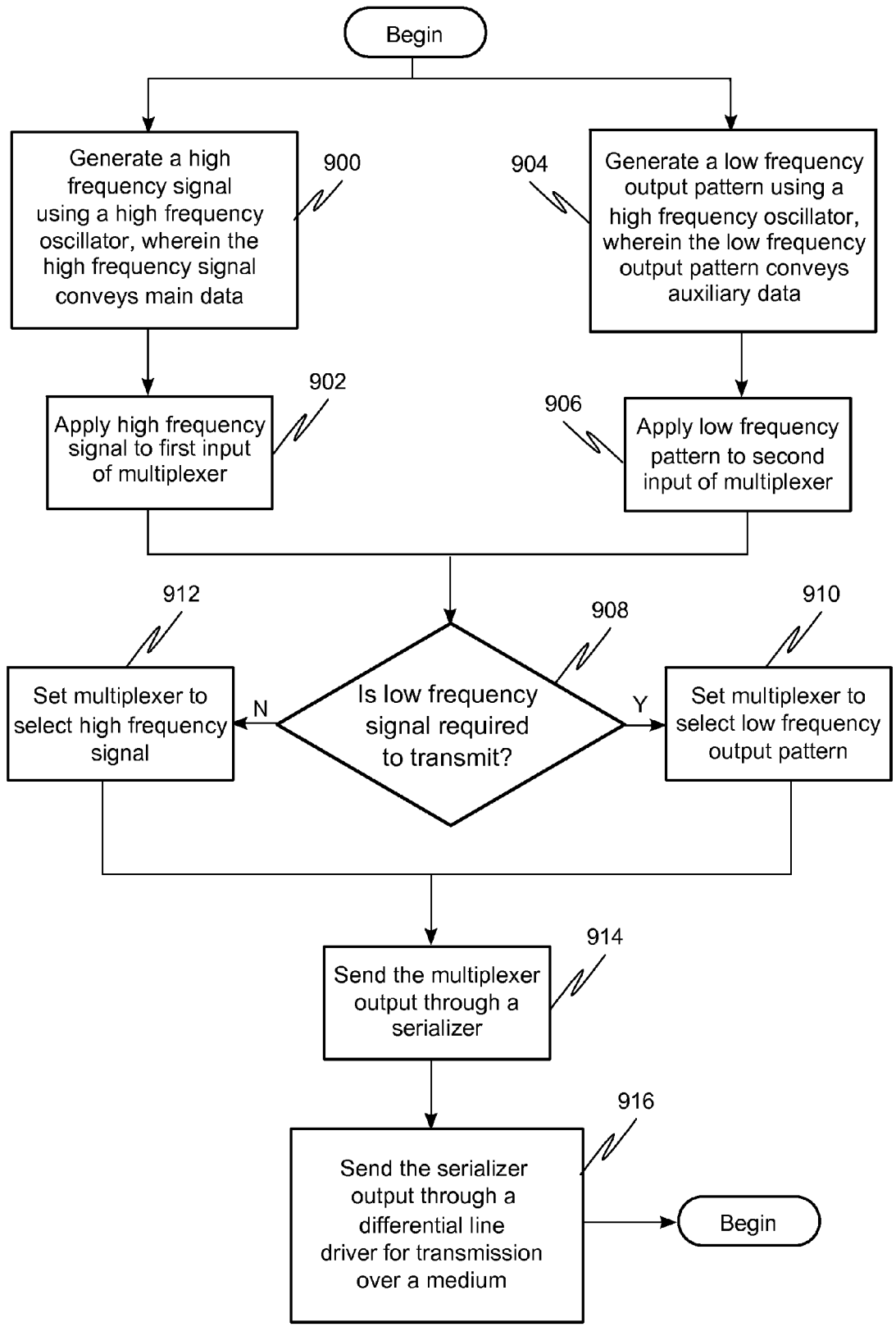
FIG. 9 is a flow diagram illustrating a method for communicating main and auxiliary data over a cable in accordance with an embodiment of the present invention.

FIG. 9 is a flow diagram illustrating a method for communicating main and auxiliary data over a cable in accordance with an embodiment of the present invention. The low-frequency output pattern and high-frequency signal can be generated in parallel. As such, the figure depicts two alternative paths for the flow. At 900, a high-frequency signal can be generated using a high-frequency oscillator, wherein the high-frequency signal conveys main data. At 902, the high-frequency signal is applied to a first input of a multiplexer. At 904, a low-frequency output pattern can be generated using a high-frequency oscillator, wherein the low-frequency output pattern conveys auxiliary data. At 906, the low-frequency pattern is applied to a second input of the multiplexer.

At 908, it is determined whether the multiplexer should transmit the low-frequency signal. If so, then at 910 the multiplexer is set to select the low-frequency output pattern. If not, then at 912, the multiplexer is set to select the high-frequency signal. Then at 914, the multiplexer output is sent through a serializer. At 916, the serializer output is sent through a differential line driver for transmission over a medium.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is defined as any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A method for communicating main and auxiliary data over a transmission medium, the method comprising:
    generating a low-frequency output pattern using a high-frequency oscillator, wherein the low-frequency output pattern contains the auxiliary data encoded in a first scheme, wherein the first scheme resembles an output pattern that would be generated by a low-frequency oscillator;
    sending the low-frequency output pattern through a transmitter to be transmitted over the transmission medium;
    generating a high-frequency signal using the high-frequency oscillator, wherein the high-frequency signal contains the main data encoded in a second scheme different than the first scheme; and
    sending the high-frequency signal through the transmitter to be transmitted over the transmission medium.

2. The method of claim 1, wherein the first scheme encodes data by mapping the data to the length of bursts of repeating is and to intervals between such bursts.

3. The method of claim 1, wherein the transmission medium is a cable.

4. The method of claim 1, wherein the transmission medium is an optical fiber.

5. The method of claim 1, wherein the transmission medium is a wireless transmission medium.

6. The method of claim 1, wherein the low-frequency output pattern is passed through a serializer prior to being sent through the transmitter.

7. A Low-Frequency Periodic Signaling (LFPS) generator comprising:
    a high-frequency generator configured to generate both high-frequency signals containing main data and LFPS signals containing auxiliary data, wherein the LFPS signals are encoded in a different encoding scheme than the high-frequency signals;
    a serializer;
    a multiplexer connected between the high-frequency generator and the serializer and configured to, when LFPS is enabled, take the LFPS signals generated by the high-frequency generator and pass them through the serializer and configured to, when LFPS is not enabled, take the high-frequency signals generated by the high-frequency generator and pass them through the serializer; and
    a transmitter coupled to the serializer.

8. The LFPS generator of claim 7, wherein the transmitter is compatible with the Universal Serial Bus 3.0 standard.

9. The LFPS generator of claim 7, wherein the auxiliary data includes power management information.

10. The LFPS generator of claim 7, wherein the auxiliary data includes signal initialization information.

11. An apparatus for communicating main and auxiliary data over a cable, the apparatus comprising:
    means for generating a low-frequency output pattern using a high-frequency oscillator, wherein the low-frequency output pattern contains the auxiliary data encoded in a first scheme, wherein the first scheme resembles an output pattern that would be generated by a low-frequency oscillator;
    means for sending the low-frequency output pattern through a transmitter to be transmitted over the transmission medium;
    means for generating a high-frequency signal using the high-frequency oscillator, wherein the high-frequency signal contains the main data encoded in a second scheme different than the first scheme; and
    means for sending the high-frequency signal through the transmitter to be transmitted over the transmission medium.

12. The apparatus of claim 11, wherein the first scheme encodes data by mapping the data to the length of bursts of repeating is and to intervals between such bursts.

13. The apparatus of claim 11, wherein the low-frequency output pattern is passed through a serializer prior to being sent through the transmitter.

14. The apparatus of claim 11, wherein the apparatus is compatible with the PCIe standard.

15. A non-transitory program storage device readable by a machine, tangibly embodying a program of instructions executable by the machine to perform a method for communicating main and auxiliary data over a cable, the method comprising:
    generating a low-frequency output pattern using a high-frequency oscillator, wherein the low-frequency output pattern contains the auxiliary data encoded in a first scheme, wherein the first scheme resembles an output pattern that would be generated by a low-frequency oscillator;
    sending the low-frequency output pattern through a transmitter to be transmitted over the transmission medium;
    generating a high-frequency signal using the high-frequency oscillator, wherein the high-frequency signal contains the main data encoded in a second scheme different than the first scheme; and
    sending the high-frequency signal through the transmitter to be transmitted over the transmission medium.

16. The non-transitory program storage device of claim 15, wherein the first scheme encodes data by mapping the data to the length of bursts of repeating is and to intervals between such bursts.

17. The non-transitory program storage device of claim 15, wherein the transmission medium is a cable.

18. The non-transitory program storage device of claim 15, wherein the transmission medium is an optical fiber.

19. The non-transitory program storage device of claim 15, wherein the transmission medium is a wireless transmission medium.

20. The non-transitory program storage device of claim 15, wherein the low-frequency output pattern is passed through a serializer prior to being sent through the transmitter.

* * * * *